United States Patent
Miyazaki (10) Patent No.: US 11,006,027 B2
(45) Date of Patent: May 11, 2021

(54) PHOTOGRAPHING SYSTEM FOR SETTING LIGHT EMISSION AMOUNT OF STROBE, ILLUMINATION APPARATUS, AND CONTROL METHOD

(71) Applicant: CANON KABUSHIKI KAISHA, Tokyo (JP)

(72) Inventor: Sho Miyazaki, Kawasaki (JP)

(73) Assignee: CANON KABUSHIKIKAISHA, Tokyo (JP)

( * ) Notice: Subject to any disclaimer, the term of this patent is extended or adjusted under 35 U.S.C. 154(b) by 0 days.

(21) Appl. No.: 16/707,152

(22) Filed: Dec. 9, 2019

(65) Prior Publication Data

US 2020/0195821 A1   Jun. 18, 2020

(30) Foreign Application Priority Data

Dec. 13, 2018  (JP) .............................. JP2018-233565

(51) Int. Cl.
*H04N 5/225*  (2006.01)
*H04N 5/232*  (2006.01)
(Continued)

(52) U.S. Cl.
CPC ....... *H04N 5/2256* (2013.01); *H04N 5/23216* (2013.01); *H04N 5/232939* (2018.08); *H05B 41/38* (2013.01); *H05B 47/11* (2020.01)

(58) Field of Classification Search
CPC ............. H04N 5/2256; H04N 5/23216; H04N 5/232933; H04N 5/232939; H04N 5/2351;
(Continued)

(56) References Cited

U.S. PATENT DOCUMENTS

2001/0048474 A1*  12/2001  Yamazaki ............ H04N 5/2351
                                                348/207.99
2003/0026606 A1*   2/2003  Ume ..................... H04N 5/2256
                                                396/164
(Continued)

FOREIGN PATENT DOCUMENTS

JP         2011059406 A       3/2011

*Primary Examiner* — Amy R Hsu
(74) *Attorney, Agent, or Firm* — Rossi, Kimms & McDowell LLP (57) ABSTRACT

A photographing system which can securely set a manual light amount to an appropriate light emission amount after changing the manual light amount of a strobe according to a photometry result at the time of pre-light emission. In the photographing system, when a light-emission amount automatic adjustment in a metered manual starts in a manual light-emission mode after setting a light emission amount of the light-emitting part in the main light emission within a first range by a user operation in the manual light-emission mode, a main appropriate light emission amount is calculated on a basis of a photometry result before and after the pre-light emission by a photometric circuit, then in a case where the calculated main appropriate light emission amount falls within a second range and is outside the first range, the light emission amount of the light-emitting part in the main light emission is changed to the main appropriate light emission amount, wherein the second range, wherein the second range, including the first range and wider than the first range, is possible to perform automatic light adjustment in the illumination apparatus.

14 Claims, 8 Drawing Sheets (51) Int. Cl.
*H05B 41/38* (2006.01)
*H05B 47/11* (2020.01)

(58) Field of Classification Search
CPC .... H04N 5/2354; H05B 41/325; H05B 41/38; H05B 47/11; Y02B 20/40
See application file for complete search history.

(56) References Cited

U.S. PATENT DOCUMENTS

| | | | |
|---|---|---|---|
| 2007/0223908 A1* | 9/2007 | Sakamoto | H04N 5/2351 396/234 |
| 2009/0115887 A1* | 5/2009 | Sugimoto | H04N 5/23218 348/349 |
| 2009/0136224 A1* | 5/2009 | Aoyagi | H04N 9/735 396/157 |
| 2014/0267883 A1* | 9/2014 | Vidal-Naquet | H04N 5/2351 348/362 |
| 2015/0181102 A1* | 6/2015 | Oda | H04N 5/2351 348/229.1 |

* cited by examiner

FIG. 6Cc

PHOTOGRAPHING SYSTEM FOR SETTING LIGHT EMISSION AMOUNT OF STROBE, ILLUMINATION APPARATUS, AND CONTROL METHOD

BACKGROUND OF THE INVENTION

Field of the Invention

The present invention relates to a photographing system, an illumination apparatus, and a control method, and particularly to a photographing system which includes a camera and a strobe and can set a light emission amount of the strobe, an illumination apparatus, and a control method.

Description of the Related Art

Conventionally, there is known a photographing system which can appropriately and easily set a light emission amount (hereinbelow, referred to as a manual light amount) of a strobe at the time of a main light emission in a manual light-emission mode, and includes a camera and the strobe.

For example, Japanese Laid-Open Patent Publication (kokai) No. 2011-59406 discloses a photographing system which performs a pre-light emission of the strobe, and automatically changes the manual light amount according to a photometry result obtained by measuring a reflected light from a subject.

However, in a case where the manual light amount is changed in the method disclosed in Japanese Laid-Open Patent Publication (kokai) No. 2011-59406, the manual light amount can be changed only in a range where a user can set in the manual light-emission mode. Therefore, it is not possible to sufficiently use an adjustable range of the strobe.

Figure 7:
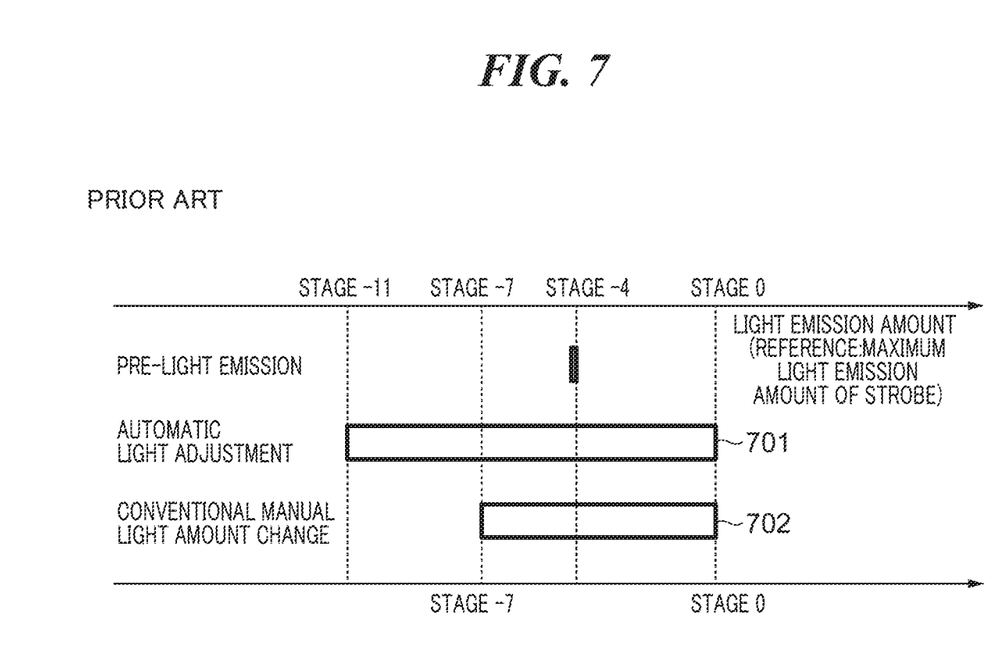
FIG. 7 is a diagram showing a relation between a light-emission amount setting range at the time of automatic strobe adjustment and a light-emission amount setting range when a manual light amount is changed in the related art.

For example, as shown in FIG. 7, after the pre-light emission is performed with a light emission amount of −4 stage in a case where a maximum light emission amount (stage 0) of the strobe is used as a reference, the range where an appropriate light emission amount at the time of the main light emission in the automatic light adjustment can be calculated becomes a range 701 from stage 0 to stage 11. However, after the pre-light emission is performed in the same condition as that of the automatic light adjustment, the range where the manual light amount can be changed in the method disclosed in Japanese Laid-Open Patent Publication (kokai) No. 2011-59406 is limited to a range 702 from stage 0 to stage −7. Therefore, in a case where the appropriate light emission amount at the time of the main light emission calculated in the automatic light adjustment is less than the light emission amount of stage −7, the manual light amount is not possible to be changed to the appropriate light emission amount.

SUMMARY OF THE INVENTION

The present invention provides a photographing system, an illumination apparatus, and a control method, which can securely set a manual light amount to an appropriate light emission amount after changing the manual light amount of a strobe according to a photometry result at the time of pre-light emission.

According to a first aspect of the present invention, a photographing system which includes an image pickup apparatus equipped with a photometric circuit to measure a reflected light from a subject, and an illumination apparatus equipped with a light-emitting part to perform a pre-light emission and a main light emission, the photographing system comprising at least one memory that stores a set of instructions, and at least one processor that executes the instructions, the instructions, when executed, causing the photographing system to perform operations comprising setting a light emission amount of the light-emitting part in the main light emission within a first range by a user operation in a manual light-emission mode, calculating a main appropriate light emission amount on a basis of a photometry result of the pre-light emission by the photometric circuit when a light-emission amount automatic adjustment in a metered manual starts in the manual light-emission mode after the light emission amount of the light-emitting part in the main light emission is set, and changing the light emission amount of the light-emitting part in the main light emission to the main appropriate light emission amount in a case where the calculated main appropriate light emission amount falls within a second range and is outside the first range, wherein the second range, wherein the second range, including the first range and wider than the first range, is possible to perform automatic light adjustment in the illumination apparatus.

According to a second aspect of the present invention, an illumination apparatus which includes a light-emitting part to perform a pre-light emission and a main light emission, the light-emitting part being connected to an image pickup apparatus equipped with a photometric circuit to measure a reflected light from a subject, the illumination apparatus comprising at least one memory that stores a set of instructions, and at least one processor that executes the instructions, the instructions, when executed, causing the illumination apparatus to perform operations comprising acquiring a light emission amount of the light-emitting part in the main light emission which is set by a user within a first range in a manual light-emission mode, acquiring a main appropriate light emission amount on a basis of a photometry result of the pre-light emission by the photometric circuit in a case where a light-emission amount automatic adjustment in a metered manual starts in the manual light-emission mode, and changing the light emission amount of the light-emitting part in the main light emission to the main appropriate light emission amount in a case where the main appropriate light emission amount falls within a second range and is outside the first range, wherein the second range, including the first range and wider than the first range, is possible to perform automatic light adjustment in the illumination apparatus.

According to the present invention, it is possible to securely set a manual light amount to an appropriate light emission amount after changing the manual light amount of a strobe according to a photometry result at the time of pre-light emission.

Further features of the present invention will become apparent from the following description of exemplary embodiments (with reference to the attached drawings).

BRIEF DESCRIPTION OF THE DRAWINGS

FIGS. 6A, 6Ba, 6Bb, 6Ca, 6Cb, 6Cc, 6Da, 6Db are diagrams which are examples showing a light-emission amount setting range according to the first embodiment.

DESCRIPTION OF THE EMBODIMENTS

The present invention will now be described in detail below with reference to the accompanying drawings showing embodiments thereof.

First Embodiment

Hereinbelow, a schematic configuration of a camera strobe system will be described as a photographing system according to a first embodiment of the invention with reference FIGS. 1 and 2.

Figure 1:
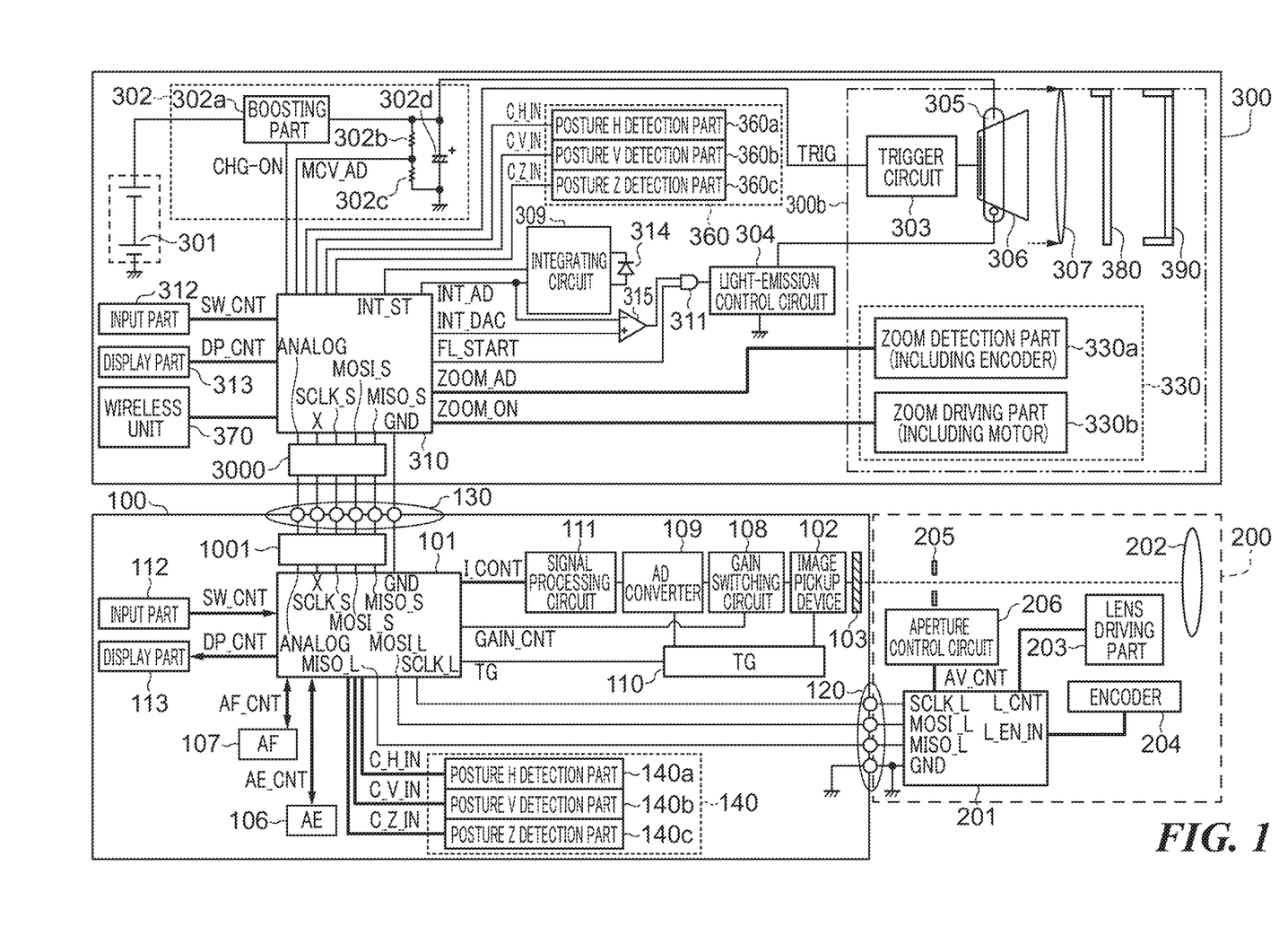
FIG. 1 is a block diagram showing a schematic configuration of a camera strobe system as a photographing system according to a first embodiment of the invention.

As shown in a block diagram of FIG. 1, the camera strobe system includes a camera body 100 which is an image pickup apparatus, a lens unit 200 which is detachably mounted on the camera body 100, and an illumination apparatus 300 which is detachably mounted on the camera body 100.

Figure 2:
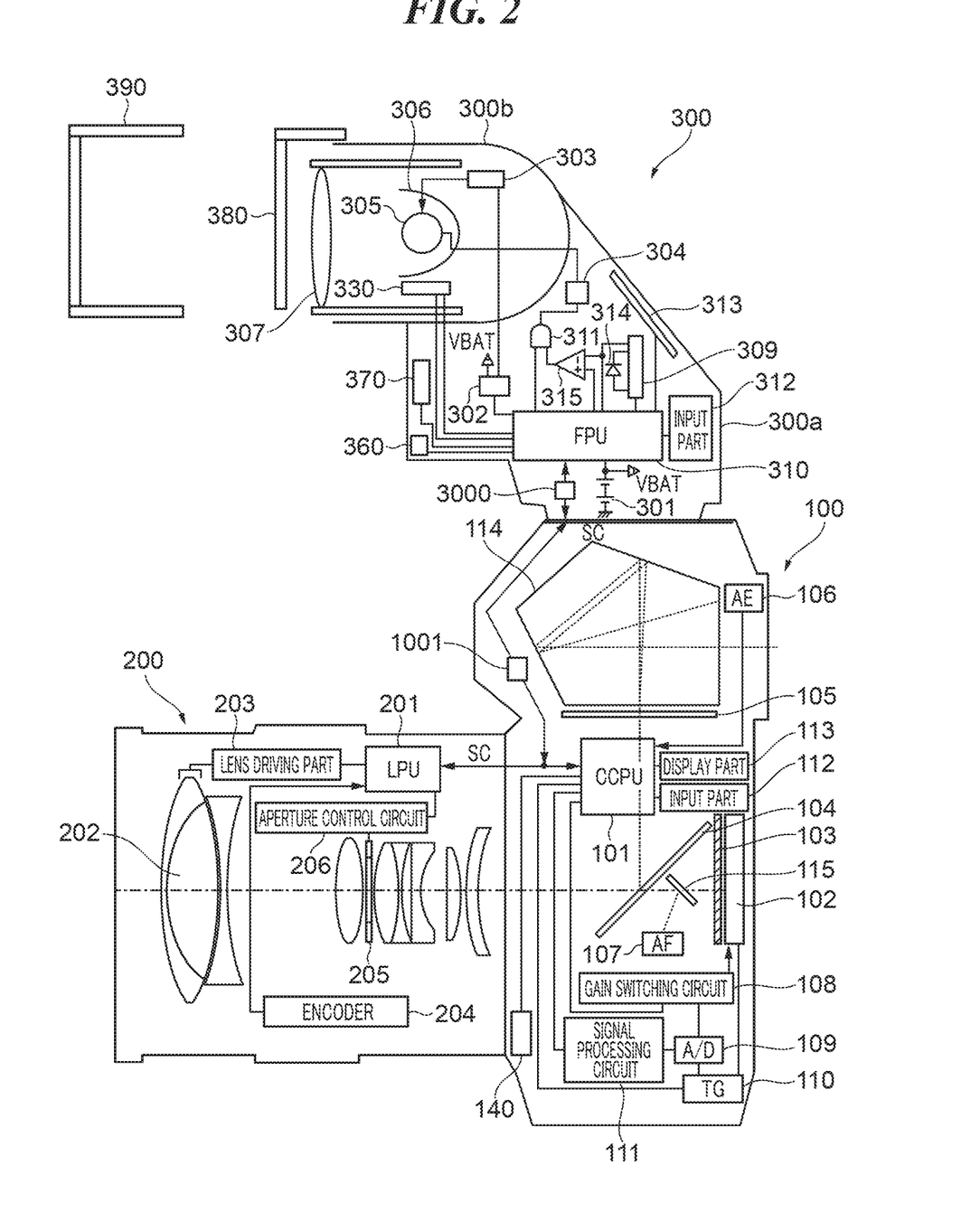
FIG. 2 is a diagram showing a schematic cross section of the camera strobe system of FIG. 1.

It should be noted that the same components in FIGS. 1 and 2 are attached with the same symbol.

First, the configuration and the operation of the camera body 100 will be described.

A CCPU (hereinbelow, camera microcomputer) 101 is a microcomputer, and controls the parts of the camera body 100.

The camera microcomputer 101 may be configured by a one-chip IC circuit embedded with a microcomputer which includes, for example, a CPU, a ROM, a RAM, an input/output control circuit (I/O control circuit), a multiplexer, a timer circuit, an EEPROM, an A/D converter, and a D/A converter.

Then, the camera microcomputer 101 controls the camera body 100 by software to determine various types of conditions.

An image pickup device 102 is an image pickup device such as a CCD or a CMOS which includes an infrared cut filter or a low pass filter. A subject image is formed when capturing an image by a lens group 202 described below, and output as image data of an analog signal.

A shutter 103 moves to a position where the image pickup device 102 is blocked, and a position where the image pickup device 102 is exposed. The camera microcomputer 101 commands a shutter control circuit (not shown) to drive the shutter 103.

As shown in FIG. 2, a main mirror (half mirror) 104 moves to a mirror down position and a mirror up position in the camera strobe system. Herein, the mirror down position indicates a position where part of light incident from the lens group 202 is reflected on the main mirror 104, and is formed as a subject image in a focus plate 105. In addition, the mirror up position is a position where the main mirror 104 is withdrawn from a photographic optical path (hereinbelow, simply referred to "optical path") of the incident light from the lens group 202 toward the image pickup device 102.

In addition, the subject image formed in the focus plate 105 (FIG. 2) is viewed by a user through an optical viewfinder (not shown).

A photometric circuit (AE circuit) 106 divides an image forming surface of a photometric sensor (not shown) provided therein into a plurality of regions, and perform photometry on each region. The subject image formed in the focus plate 105 is guided to the photometric sensor in the photometric circuit 106 through a pentaprism 114 described below.

A focus detection circuit (AF circuit) 107 includes a range finding sensor (not shown) which includes a plurality of points therein as range finding points, and outputs focus distance information such as a defocus amount of each range finding point to the camera microcomputer 101.

A gain switching circuit 108 amplifies the analog signal output from the image pickup device 102. The gain switching in the gain switching circuit 108 is performed by the camera microcomputer 101 according to a photographing condition or a user operation.

An A/D converter 109 converts the analog signal from the image pickup device 102 which is amplified by the gain switching circuit 108 into a digital signal.

A timing generator (TG) 110 synchronizes an input timing to the A/D converter 109 of the amplified analog signal from the image pickup device 102 with a conversion timing to the digital signal of the analog signal which is input in the A/D converter 109.

A signal processing circuit 111 performs signal processing on the image data which is converted into the digital signal by the A/D converter 109.

A communication line SC is a signal line which interfaces among the camera body 100, the lens unit 200, and the illumination apparatus 300. For example, the camera microcomputer 101, as a host, exchanges data or communicates information such as commands with a lens microcomputer 201 of the lens unit 200 described below and a strobe microcomputer 310 of the illumination apparatus 300 described below.

Hereinafter, as an example of the communication line SC, a serial communication of a three terminal type in a terminal 120 and a terminal 130 of FIG. 1 are shown.

The terminal 120 is a terminal which is directly connected to the camera microcomputer 101 and is detachably attached to the lens unit 200. The terminal 120 includes an SCLK_L terminal to synchronize the communications between the camera body 100 and the lens unit 200, a MOSI_L terminal to send data to the lens unit 200, and a MISO_L terminal to receive the data sent from the lens unit 200. In addition, the terminal 120 also includes a GND terminal which connects the camera body 100 and the lens unit 200.

The terminal 130 is a terminal, such as an accessory shoe, which is connected to the camera microcomputer 101 through a camera interface circuit 1001, and through which the illumination apparatus 300 and a camera accessory apparatus (not shown) are detachably attached to the camera body 100. The terminal 130 includes an SCLK_S terminal to synchronize the communication between the camera body 100 and the illumination apparatus 300, a MOSI_S terminal to send data from the camera body 100 to the illumination apparatus 300, and a MISO_S terminal to receive the data sent from the illumination apparatus 300. In addition, the terminal 130 also includes a GND terminal which connects the camera body 100 and the illumination apparatus 300.

The camera interface circuit 1001 communicates with the camera microcomputer 101 and a strobe interface circuit 3000 through the terminal 130.

When the data is sent from the camera microcomputer 101 to the strobe microcomputer 310 described below, the data is sent in serial by setting each bit from the MOSI_S terminal to 0 or 1 in synchronization with an 8-bit clock of the SCLK_S terminal.

In addition, when the data is sent from the strobe microcomputer 310 to the camera microcomputer 101, the data set each bit to 0 or 1 is received in serial from the MISO_S terminal in synchronization with the 8-bit clock of the SCLK_S terminal.

A signal is read at a rising edge of the SCLK_S signal in the 8-bit (1 byte) communication. However, the 8-bit communication is continuously performed a plurality of times with a command, command data, and data.

An input part 112 includes operation parts such as a power switch, a release switch, and a setting button. The camera microcomputer 101 performs various types of processes in accordance with a user input to the input part 112. The input part 112 also includes a FELK button which is used in a case where a light-emission amount automatic adjustment in a metered manual (described below) is performed when capturing an image. In addition, the input part 112 also includes an operation part which is used when the light emission amount of a light-emitting part of the illumination apparatus 300 (hereinbelow, referred to as a manual light amount) when the light emission is mainly performed by the user in a manual light-emission mode described below. It should be noted that a main light emission represents that the light emits in synchronization with the photographing. A pre-light emission (described below) represents that the light emits preliminarily to determine the light emission amount at the time of the main light emission.

If the release switch of the input part 112 is operated in one stage (half-pressed), "SW1", which is a switch (not shown) connected to the release switch, is turned ON, then the camera microcomputer 101 starts a photographing preparation operation such as focus adjustment and light metering. In addition, if the release switch is operated in two stages (fully-pressed), "SW2", which is a switch (not shown) connected to the release switch, is turned ON, then the camera microcomputer 101 starts a photographing operation such as exposure and developing process.

In addition, the user can determine various types of setting of the illumination apparatus 300 mounted in the camera body 100 by operating the setting button or the like of the input part 112.

A display part 113 includes a liquid crystal apparatus or a light-emitting element to display a mode where various settings are determined or another photographing information.

The pentaprism 114 shown in FIG. 2 guides the subject image formed in the focus plate 105 to the photometric sensor in the photometric circuit 106 and the optical viewfinder (not shown).

A sub-mirror 115 shown in FIG. 2 guides the light which is incident from the lens group 202 (described below) of the lens unit 200 and penetrates the main mirror 104 toward the range finding sensor of the focus detection circuit 107.

A posture detection circuit 140 is a circuit which detects a posture difference, and includes a posture H detection part 140a to detect a posture difference in a horizontal direction, a posture V detection part 140b to detect a posture difference in a vertical direction, and a posture Z detection part 140c to detect a posture difference in a front-back direction (Z direction).

As the posture detection circuit 140, for example, an angular velocity sensor or a gyro sensor may be used. Posture information related to the posture difference in each direction detected by the posture detection circuit 140 is input to the camera microcomputer 101.

Next, the configuration and the operation of the lens unit 200 will be described.

An LPU (hereinbelow, the lens microcomputer) 201 is a microcomputer, and controls the parts of the lens unit 200.

The lens microcomputer 201 may be configured by a one-chip IC circuit embedded with a microcomputer which includes, for example, a CPU, a ROM, a RAM, an input/output control circuit (I/O control circuit), a multiplexer, a timer circuit, an EEPROM, an A/D converter, and a D/A converter.

The lens group 202 is configured by a plurality of lenses including a focus lens and a zoom lens. It should be noted that a zoom lens may be not included in the lens group 202.

A lens driving part 203 is a driving system which moves each lens in the lens group 202. A driving amount of the lens group 202 is calculated in the camera microcomputer 101 on the basis of the output of the focus detection circuit 107 which is in the camera body 100. The driving amount calculated in the camera microcomputer 101 is sent from the camera microcomputer 101 to the lens microcomputer 201.

An encoder 204 detects the position of the lens group 202, and outputs driving information. The lens driving part 203 moves the lens group 202 as much as the driving amount which is calculated in the camera microcomputer 101 on the basis of the driving information from the encoder 204 so as to adjust a focus.

An aperture 205 is an aperture to adjust the amount of passing light, and is controlled by the lens microcomputer 201 through an aperture control circuit 206.

Next, the configuration of the illumination apparatus 300 will be described.

The illumination apparatus 300 is configured by a body part 300a which is detachably mounted in the camera body 100, and a movable part 300b which is held rotatably in an upward and downward direction and a right and left direction with respect to the body part 300a.

An FPU (hereinbelow, the strobe microcomputer) 310 is a microcomputer, and controls the parts of the illumination apparatus 300.

The strobe microcomputer 310 may be configured by a one-chip IC circuit embedded with a microcomputer which includes, for example, a CPU, a ROM, a RAM, an input/output control circuit (I/O control circuit), a multiplexer, a timer circuit, an EEPROM, an A/D converter, and a D/A converter.

The strobe interface circuit 3000 communicates with the camera microcomputer 101 through the terminal 130.

A battery 301 serves as a power source (VBAT) of the illumination apparatus 300.

A booster circuit block 302 is configured by a boosting part 302a, resistors 302b and 302c which are used to detect a voltage, and a main capacitor 302d. The boosting part 302a boosts the voltage of the battery 301 to several hundred V, and charges the main capacitor 302d with electric energy for light emission.

The charging voltage of the main capacitor 302d is divided by the resistors 302b and 302c. The divided voltage is input to an A/D conversion terminal MCV_AD of the strobe microcomputer 310.

A trigger circuit 303 applies a pulse voltage to the discharge tube 305 to excite a discharge tube 305 (described below).

A light-emission control circuit 304 controls starting and stopping of the light emission of the discharge tube 305.

The discharge tube 305 receives the pulse voltage of several KV from the trigger circuit 303 and is excited, and emits light using the electric energy charged in the main capacitor 302d.

An integrating circuit 309 integrates the received current of a photo diode 314 (described below), and inputs the output to an inverting input terminal of a comparator 315 (described below) and an A/D converter terminal INT_AD of the strobe microcomputer 310.

A non-inverting input terminal of the comparator 315 is connected to a D/A converter terminal INT_DAC in the strobe microcomputer 310, and the output of the comparator 315 is connected to an input terminal of an AND gate 311 (described below).

The other input of the AND gate 311 is connected to a light-emission control terminal FL_START of the strobe microcomputer 310, and the output of the AND gate 311 is input to the light-emission control circuit 304.

The photo diode 314 is a sensor which receives light emitted from the discharge tube 305, and receives the light emitted from the discharge tube 305 directly or through a glass fiber.

A reflector 306 reflects the light emitted from the discharge tube 305 to guide the light in a predetermined direction.

A zoom optical system 307 is an optical system which includes an optical panel, and is held to change a relative position to the discharge tube 305 and changes a relative position between the discharge tube 305 and the zoom optical system 307, so that a guide number and an irradiation range of the illumination apparatus 300 is changed.

The light-emitting part of the illumination apparatus 300 is mainly configured by the discharge tube 305, the reflector 306, and the zoom optical system 307. The irradiation range of the light-emitting part varies as the zoom optical system 307 moves. An irradiation direction of the light-emitting part varies as the movable part 300b rotates.

An input part 312 includes operation parts such as a power switch, a mode setting switch to set an operation mode of the illumination apparatus 300, and a setting button to set various types of parameters. The strobe microcomputer 310 performs various types of processes according to a user input to the input part 312. The input part 312 also includes an operation part to change a setting of light-adjustment correction of the illumination apparatus 300.

A display part 313 includes a liquid crystal apparatus and a light-emitting element to display each state of the illumination apparatus 300. In addition, the display part 313 also includes an LED to display a warning in a case where the light emission is less than a lower limit of the light-emission range described below.

A zoom driving circuit 330 is configured by a zoom detection part 330a which includes an encoder to detect information related to a relative position between the discharge tube 305 and the zoom optical system 307, and a zoom driving part 330b which includes a motor to move the zoom optical system 307.

The driving amount of the zoom optical system 307 is calculated by the strobe microcomputer 310 on the basis of the focus distance information acquired from the lens microcomputer 201 through the camera microcomputer 101.

A posture detection circuit 360 is a circuit to detect a posture difference, and includes a posture H detection part 360a to detect the posture difference in the horizontal direction, a posture V detection part 360b to detect the posture difference in the vertical direction, and a posture Z detection part 360c to detect the posture difference in the front-back direction (Z direction).

As the posture detection circuit 360, for example, an angular velocity sensor or a gyro sensor may be used. Posture information related to the posture difference in each direction detected by the posture detection circuit 360 is input to the strobe microcomputer 310.

A wireless unit 370 is a well-known wireless unit, and controls the entire illumination apparatus 300 by a wireless transceiver.

A wide panel 380 is an optical member which can expand the irradiation range of the light-emitting part at a position ahead of the irradiation direction of the light-emitting part, and is drawn out of the movable part 300b by manual.

A bounce adapter 390 is an optical member which can expand the irradiation range of the light-emitting part, and is covered at a position ahead of the irradiation direction of the light-emitting part.

Further, the wide panel 380 diffuses the light emission in a direction of a subject, but the bounce adapter 390 does not diffuse the light emission in the direction of the subject because of a difference in diffusing the light emission up and down, and right and left.

Next, the description will be given about the light-emission amount automatic adjustment in the metered manual to expand the light-emission amount setting range at the time of changing the manual light amount in order to securely set the manual light amount after changing to an appropriate light emission amount when the manual light amount is changed according to a photometry result before and after the pre-light emission.

Figure 3:
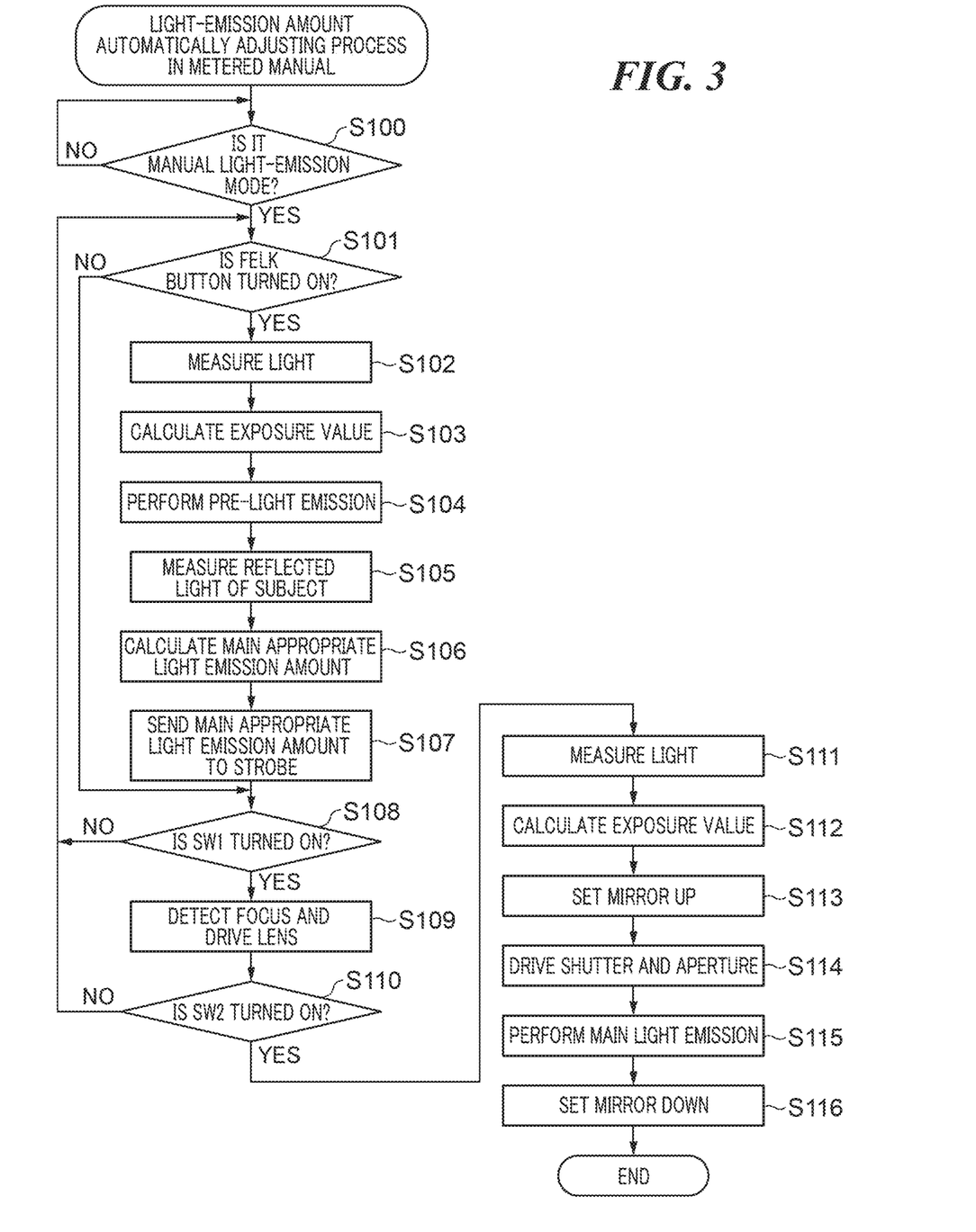
FIG. 3 is a flowchart of a light-emission amount automatically adjusting process in a metered manual according to the first embodiment.

FIG. 3 is a flowchart of a light-emission amount automatically adjusting process in a metered manual according to the first embodiment. This process is performed by the camera microcomputer 101. Further, in this flowchart, a sequence of a so-called manual light-emission mode will also be described where the light-emission amount setting range is not expanded, and an appropriate light amount is not set.

First, the camera microcomputer 101 initializes its own memory and ports in a case where it is determined that the manual light-emission mode is set by a user's input operation to the input part 112 of the camera body 100 (YES in step S100). In addition, various photographing conditions, such as a shutter speed or an aperture value, are set in line with a state of each switch in the input part 112 and predetermined information. In addition, if the manual light amount is set by the user operation to the input part 112 within a setting range (a first range described below) in the manual light-emission mode, the camera microcomputer 101 sends the setting to the strobe microcomputer 310.

In step S101, after the operation of the camera body 100 starts, the user turns on the FELK button which is a switch for the pre-light emission of the input part 112, and determines whether there is a start command of the light-emission amount automatic adjustment in the metered manual described below. As a result of the determination, in a case where the FELK button is turned on, the process proceeds to step S102. In a case where the FELK button is not turned on, the process proceeds to step S108. By the way, in a case where the FELK button is not turned on in step S101, and the process proceeds to step S108, the light-emission amount setting range is not expanded until the present process ends, and the manual light amount is not even changed (that is, a sequence of the conventional manual light-emission mode is executed).

In step S102, if the light-emission amount automatic adjustment in the metered manual starts, the camera microcomputer 101 commands the strobe microcomputer 310 to perform the pre-light emission, measures a reflected light of the subject by the photometric circuit 106 in the pre-light emission, and acquires the photometry result. Thereafter, the camera microcomputer 101 obtains an appropriate light emission amount (hereinbelow, referred to as a main appropriate light emission amount) at the time of the main light emission by the illumination apparatus 300 on the basis of the acquired photometry result, and sends the appropriate light emission amount to the illumination apparatus 300. In the illumination apparatus 300, the light emission amount to be set at the time of the main light emission is changed from the manual light amount which is acquired from the camera microcomputer 101 according to the main appropriate light emission amount. Thereafter, the aperture control circuit 206 is driven at a time point when SW2 is turned on so as to set an appropriate aperture. In addition, the main mirror 104 and the sub-mirror 115 are flipped up to the upper part at a time point when SW2 is turned on so as to retreat the mirrors from the optical path. The driving of the main mirror 104 and the sub-mirror 115 is ended and the shutter 103 is opened, so that the main light emission is performed by the illumination apparatus 300. The invention is featured in the operation when the manual light amount is changed in the illumination apparatus 300 according to the main appropriate light emission amount as described below in FIG. 4 in a case where the light-emission amount automatic adjustment in the metered manual starts in the manual light-emission mode.

In step S102, a subject luminance value By is measured by the photometric circuit 106. Then, in step S103, an appropriate exposure amount (EvS) is calculated with a well-known algorithm on the basis of the photometry result acquired in step S102. In addition, the shutter speed of the shutter 103 and the aperture value of the aperture 205 are also determined according to a set exposure mode.

Next, in step S104, a predetermined light emission amount is commanded to the strobe microcomputer 310, and the pre-light emission is performed by the light-emitting part of the illumination apparatus 300. Then, in step S105, the reflected light of the subject at the time of the pre-light emission is measured by the photometric circuit 106, and the exposure amount (EvF) at the time of the pre-light emission is obtained.

Further, in step S106, the exposure amount (EvF) at the time of the pre-light emission measured in step S105 is subtracted from the appropriate exposure amount (EvS) obtained in step S103 so as to obtain the main appropriate light emission amount. In other words, a luminance required to obtain an appropriate exposure at the time of the main light emission is obtained by subtracting the luminance of the reflected light of the pre-light emission of the illumination apparatus 300 from the luminance of the subject under a natural light. Then the main appropriate light emission amount which becomes the required luminance is calculated.

In step S107, the camera microcomputer 101 sends the main appropriate light emission amount obtained in step S106 to the strobe microcomputer 310. The strobe microcomputer 310 performs a process of changing the light emission amount on the basis of the main appropriate light emission amount acquired from the camera microcomputer 101 and the light-emission amount setting range which is currently set. The process of changing the light emission amount of the strobe microcomputer 310 will be described below using a flowchart of FIG. 4.

Herein, the description in the first embodiment will be given in a case where the light-emission amount setting range includes a first light-emission amount setting range and a second light-emission amount setting range.

The first light-emission amount setting range (hereinbelow, simply referred to as a first range) is a range which can be set by the user in the manual light-emission mode where the light-emission amount automatic adjustment in the metered manual is not performed. In the first embodiment, the first range is a range from 1/1 (stage 0) to 1/128 (stage −7) with a maximum light emission amount as a reference. The second light-emission amount setting range (hereinbelow, simply referred to as a second range) is a range in which the strobe microcomputer 310 can automatically adjust the light in a case where the light-emission amount automatic adjustment in the metered manual is performed. In the first embodiment, the second range is a range from 1/1 (stage 0) to 1/2048 (stage −11). In this way, the second range includes the first range and can be set even for the light emission amount less than the minimum value (i.e. stage −7) of the first range can be set. The second range is expanded from the first range. In other words, it is not possible that the user operates the input part 312 to set the light emission amount of the expanded range (i.e. range from stage −7 to stage −11) in the manual light-emission mode where the light-emission amount automatic adjustment in the metered manual is not performed. On the other hand, in a case where the main appropriate light emission amount received by the strobe microcomputer 310 from the camera microcomputer 101 in step S107 falls within the expanded range, the manual light amount is changed to the main appropriate light emission amount by the strobe microcomputer 310.

Hereinbelow, in step S100, the light-emission amount setting range is the first range and the light emission amount (manual light amount) at the time of the main light emission is set to 1/1 by the user as shown with a black square 601 in the screen of FIG. 6A displayed in the display part 313. Herein, a light emission bar 600 of FIG. 6A is a light emission bar to display a light emission amount which can be set, and may display a range from 1/1 (stage 0) to 1/128 (stage −7) which is the first range. The black square 601 of FIG. 6A indicates a light emission amount which is set. In other words, it can be seen that the manual light amount is set to 1/1 by the light emission bar 600 and the black square 601 of FIG. 6A. In FIG. 6A, the range from 1/1 to 1/4 is displayed in the light emission bar 600. However, the range which can be set as the light emission amount displayed by the light emission bar 600 is changed by operating the input part 312. In conjunction with the above configuration, the set manual light amount shown by the black square 601 is also changed in the range from 1/1 (stage 0) to 1/128 (stage −7) of the light emission amount.

Figure 4:
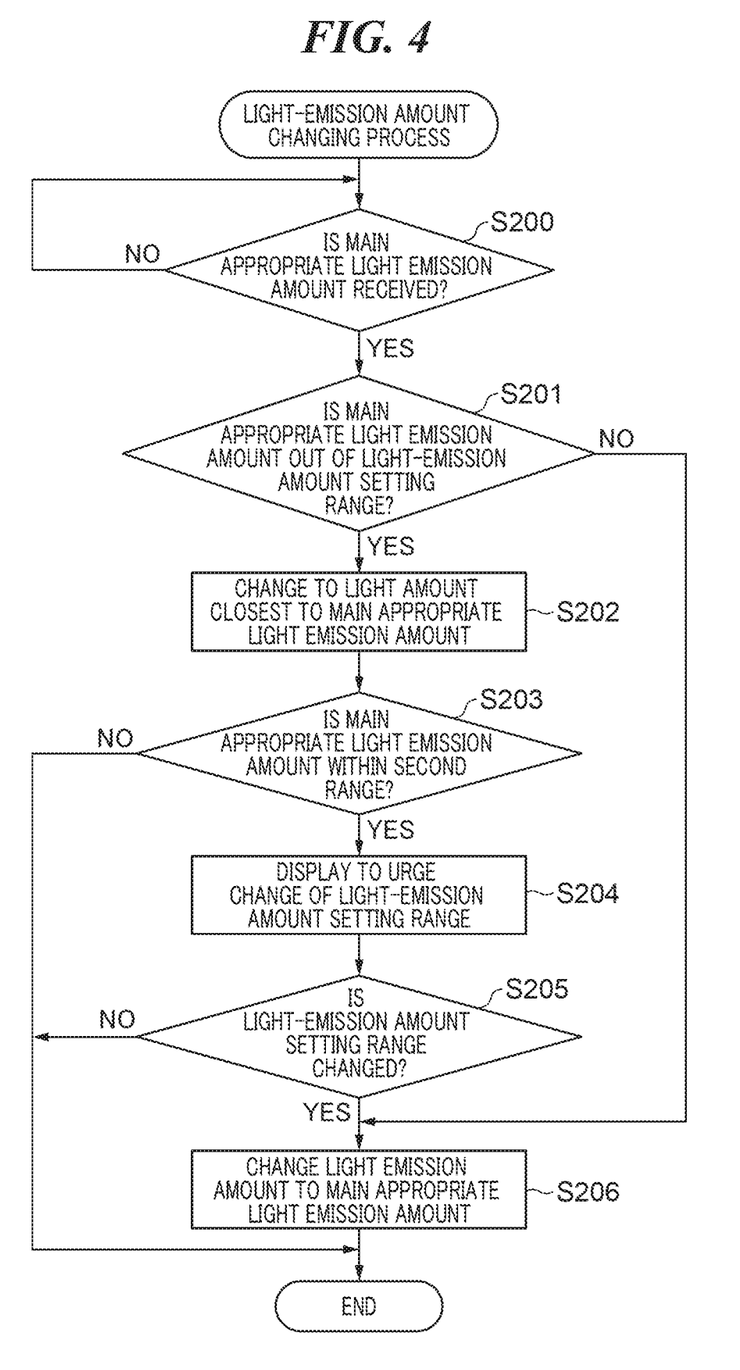
FIG. 4 is a flowchart of a light-emission amount changing process according to the first embodiment.

FIG. 4 is a flowchart of a light-emission amount changing process according to the first embodiment. This process is performed by the strobe microcomputer 310.

In step S200, in a case where it is determined in step S107 of FIG. 3 that the main appropriate light emission amount is received from the camera microcomputer 101, the process proceeds to step S201.

In step S201, it is determined whether the main appropriate light emission amount is out of the current light-emission amount setting range on the basis of the current light-emission amount setting range and the main appropriate light emission amount received in step S200. In a case where the main appropriate light emission amount is not out of the current light-emission amount setting range, the process proceeds to step S206, and the light emission amount is changed to the main appropriate light emission amount received in step S200. In a case where the main appropriate light emission amount is out of the current light-emission amount setting range, the process proceeds to step S202. Hereinbelow, the description will be given about a case where the first range is set as the current light-emission amount setting range.

Figure 6:
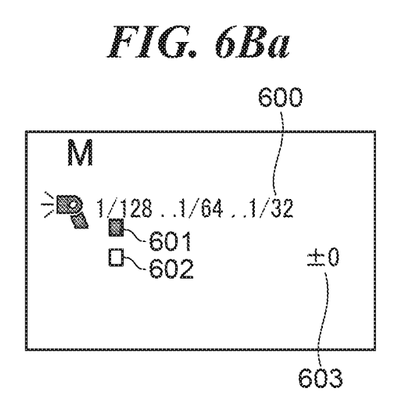
Figure 6A:
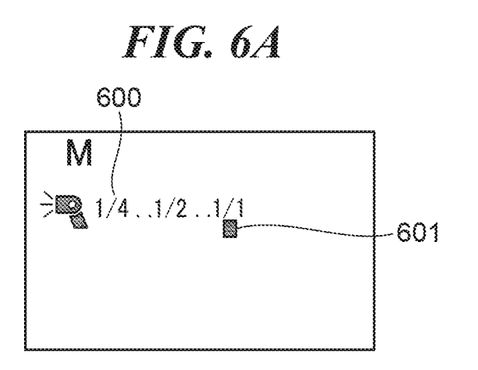

FIG. 6Ba shows a display example when the process proceeds to step S206, and the light emission amount is changed from the manual light amount set in step S100 to the main appropriate light emission amount received in step S200.

FIG. 6Ba shows a screen example which is displayed in the display part 313 in a case where the main appropriate light emission amount received in step S200 is 1/128 (stage −7). The light emission bar 600 of FIG. 6Ba is a light emission bar to display the light emission amount which can be set similarly to the light emission bar 600 of FIG. 6A. In the light emission bar 600, the light emission amount 1/1 is set as the manual light amount in the screen of FIG. 6A. Therefore, the range from 1/1 to 1/4 is displayed. With this regard, in the screen of FIG. 6Ba, the range 1/32 to 1/128 is displayed in the light emission bar 600 as the main appropriate light emission amount is changed to the light emission amount 1/128 received in step S200. The black square 601 of FIG. 6Ba indicates a light emission amount which is set similarly to the black square 601 of FIG. 6A. In other words, it can be seen that the light emission amount after changing is set to 1/128 (stage −7) by the light emission bar 600 and the black square 601 of FIG. 6Ba. A white square 602 of FIG. 6Ba indicates the main appropriate light emission amount. A light amount difference 603 indicates a difference of a light amount of the light emission after changing with respect to the main appropriate light emission amount. In this example, the light emission amount after changing and the main appropriate light emission amount are matched. Therefore, "±0" is displayed as the light amount difference 603.

In step S202, the strobe microcomputer 310 changes the light emission amount to a light amount closest to the main appropriate light emission amount in the current light-emission amount setting range.

In step S203, the strobe microcomputer 310 determines whether the main appropriate light emission amount is within the second range. In a case where the main appropriate light emission amount falls within the second range, the process proceeds to step S204. The strobe microcomputer 310 performs displaying to urge the change (expansion) of the current light-emission amount setting range (first range) to the second range which includes the main appropriate light emission amount.

FIG. 6Ca is a screen example displayed in the display part 313 in a case where the main appropriate light emission amount received by the strobe microcomputer 310 is 1/512 in step S200, and the current light-emission amount setting range is the first range. The light amount difference 603 in the drawing indicates a difference of the light emission amount after changing in step S202 with respect to the main appropriate light emission amount. In step S202, it is not possible to change the light emission amount to 1/512 of the main appropriate light emission amount, which is outside the first range. Therefore, the light emission amount is changed to 1/128 which is a light amount closest to the main appropriate light emission amount in the first range. Therefore, it is displayed that the light emission amount is set to stage +2 in the light amount difference 603 with respect to 1/512 of the main appropriate light emission amount.

In addition, a range 606 is displayed to urge the change (expansion) of the current light-emission amount setting range (first range) to the second range which includes the main appropriate light emission amount.

Thereafter, in step S205, the strobe microcomputer 310 determines whether the light-emission amount setting range is changed (expanded) from the first range to the second range by a user's operation on the input part 312. In a case where the light-emission amount setting range is changed, the process proceeds to step S206, and the light emission amount is changed to the main appropriate light emission amount. In this case, the screen is switched from FIG. 6Ca to FIG. 6Bb to inform the user of the fact that the setting range of the light emission amount of the main light emission is changed to the second range, and this process ends.

FIG. 6Bb is a screen example displayed in the display part 313 in step S206 in a case where the main appropriate light emission amount received in step S200 is 1/2048 (stage −11), and the light-emission amount setting range is changed to the second range in step S205. A black arrow 604 in the drawing is an arrow indicating the fact that the light emission amount changed in step S206 is a light emission amount outside the first range which is the light-emission amount setting range before changing (i.e. a light emission amount less than 1/128 (stage −7)), and the user is not possible to directly set the amount.

In addition, a white arrow 605 of FIG. 6Bb indicates that the main appropriate light emission amount is less than 1/128. In the first embodiment, the light emission amount in step S206 is changed to the main appropriate light emission amount. Therefore, "±0" is denoted near the right side in the screen of FIG. 6Bb as shown in the light amount difference 603 of FIG. 6Ba.

Further, in a case where the main appropriate light emission amount is less than 1/128 (stage −7) and equal to or more than 1/2048 (stage −11), and the current light-emission amount setting range is the second range, the screen displayed in the display part 313 is the same as the screen example shown in FIG. 6Bb.

On the other hand, in a case where the light-emission amount setting range is not changed in step S205, this process ends as it is. In addition, even in a case where it is determined in step S203 that the main appropriate light emission amount is outside the second range, this process ends as it is.

FIG. 6Cb is a first screen example to be displayed in the display part 313 in a case where it is determined in step S203 that the main appropriate light emission amount is outside the second range. This example is a display example in a case where the main appropriate light emission amount received by the strobe microcomputer 310 is 1/4096 (stage −12) in step S200, and the current light-emission amount setting range is the first range. In the case of this example, the light emission amount is not possible to be set to the main appropriate light emission amount even if the light-emission amount setting range is set to the second range. Therefore, the range 606 displayed in FIG. 6Ca is not displayed. In addition, in step S202, it is not possible to change the light emission amount to 1/4096 of the main appropriate light emission amount outside the first range. Therefore, the light emission amount is changed to 1/128 which is a light amount closest to the main appropriate light emission amount in the first range. Therefore, +5 is displayed in the light amount difference 603 as a difference of the light emission amount after changing with respect to the main appropriate light emission amount.

FIG. 6Cc is a second screen example to be displayed in the display part 313 in a case where it is determined in step S203 that the main appropriate light emission amount is outside the second range. This example is a display example in a case where the main appropriate light emission amount received by the strobe microcomputer 310 is set to 1/4096 (stage −12) in step S200, and the current light-emission amount setting range is the second range. In the case of this example, the light emission amount is changed to 1/2048 (stage −11) which is a light amount closest to the main appropriate light emission amount (1/4096) in the second range which is the current light-emission amount setting range in step S202. However, the light emission amount after changing is outside the first range where the user can change the light emission amount (i.e. the light emission amount after changing is less than 1/128). Therefore, the black arrow 604 is displayed instead of the black square 601 of FIG. 6A. In addition, the main appropriate light emission amount is also outside the first range (i.e. the main appropriate light emission amount is less than 1/128). Therefore, the white arrow 605 is displayed instead of the white square 602 of FIG. 6Ba. Further, +1 is displayed in the light amount difference 603 as a difference of the light emission amount after changing with respect to the main appropriate light emission amount. In the screen of FIG. 6Cc, an X mark 607 is displayed which indicates that the light emission amount is not possible to be set to the main appropriate light emission amount.

Figure 5:
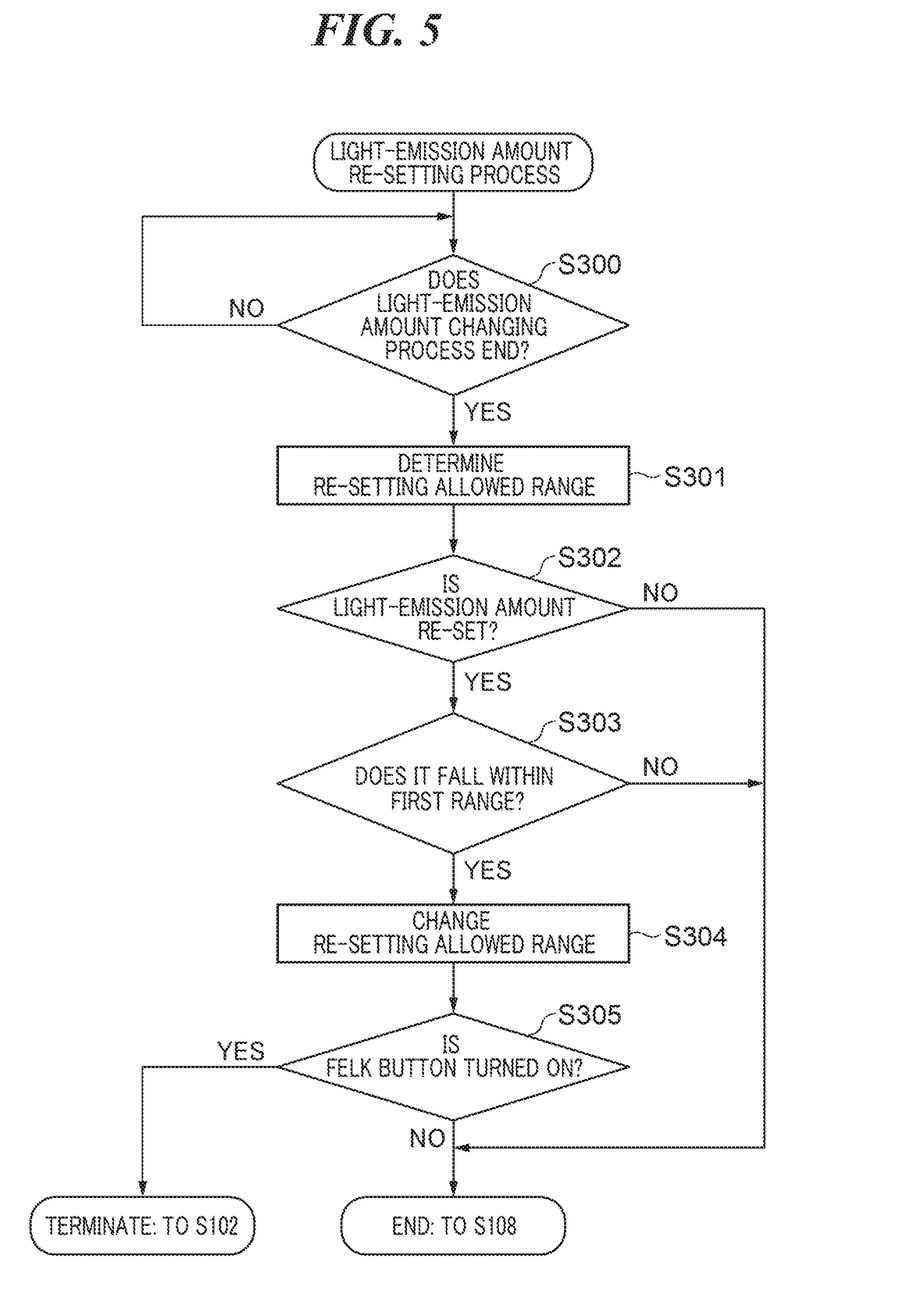
FIG. 5 is a flowchart of a light-emission amount re-setting process according to the first embodiment.

FIG. 5 is a flowchart of a light-emission amount re-setting process which is performed by the strobe microcomputer 310 when the light emission amount is reset after the user turns on the FELK button in step S101.

First, in step S300, the strobe microcomputer 310 determines whether the light-emission amount changing process of FIG. 4 ends. In a case where it is determined that the process ends, the process proceeds to step S301.

In step S301, the strobe microcomputer 310 determines a re-setting allowed range in which the user is allowed to reset the light emission amount. Herein, in a case where the current light-emission amount setting range is the first range, the range from 1/1 (stage 0) to 1/128 (stage −7) of the light emission amount is set to the re-setting allowed range. On the other hand, in a case where the current light-emission amount setting range is the second range, the range from 1/1 (stage 0) to 1/2048 (stage −11) of the light emission amount is set to the re-setting allowed range.

In step S302, the strobe microcomputer 310 determines whether the light emission amount is reset in the re-setting allowed range by a user operation on the input part 312. In a case where the re-setting is made, the process proceeds to step S303. In a case where the re-setting is not made, this process ends as it is.

In step S303, the strobe microcomputer 310 determines whether the reset light emission amount falls within the first range. In a case where the amount falls within the first range, the process proceeds to step S304. In a case where the amount falls within the second range and is outside the first range, this process ends as it is. In step S301, even in a case where the first range is determined as the re-setting allowed range of the light emission amount, this process ends as it is.

In steps S302 to S303, the screen examples to be displayed in the display part 313 are shown in FIGS. 6Da, 6Db. Herein, an appropriate light emission amount of 1/512 is assumed to be displayed in the display part 313 as shown in FIG. 6Bb at the time point of step S300. In a case where the user operates the input part 312 in step S302 from this display state so as to reset the light emission amount, and changes the setting of the light emission amount from 1/512 to 1/256, the display is changed as shown in FIG. 6Da. A numerical value indicating the light amount difference from an appropriate light amount displayed as ±0 in FIG. 6Bb is set to +1 in FIG. 6Da. The displaying of the light emission bar of FIG. 6Da is the same as that of FIG. 6Bb in which the lower limit of the first range is shown. In other words, in FIG. 6Da, in a case where the light emission amount is reset from the appropriate light amount of the second range by the user, the user is informed of the fact that the numerical value indicating the light amount difference from the appropriate light amount varies so that the light emission amount is reset.

In the stage of FIG. 6Da, the reset light emission amount does not fall within the first range from the second range. Therefore, the user can reset the light emission amount within the second range.

In a case where the user sets the light emission amount to 1/128 from the state of FIG. 6Da, the displaying is changed as shown in FIG. 6Db, the black arrow 604 of FIG. 6Da is changed to a black square indicating the current setting value. The numerical value indicating the light amount difference from the appropriate light amount in FIG. 6Db is changed from +1, which was displayed at the time of the state of FIG. 6Da, to +2.

In addition, at the time of the state of FIG. 6Db, the range where the light emission amount is resettable is changed from the second range to the first range.

In step S304, the strobe microcomputer 310 changes the re-setting allowed range of the light emission amount from the range from 1/1 (stage 0) to 1/128 (stage −7) of the light emission amount. Herein, the re-setting allowed range of the light emission amount is only changed. Thereafter, the light-emission amount setting range to be expanded in step S205 is kept in the second range, in a case where the FELK button is turned on in step S305 and the light-emission amount automatic adjustment in the metered manual restarts. With this configuration, it is possible to easily changing the light emission amount again in the second range only by turning on the FELK button in step S305.

In step S305, the strobe microcomputer 310 determines whether the FELK button is turned on. In a case where the button is pressed, this process is terminated, and the fact that the FELK button is turned on is informed to the camera microcomputer 101. When informed of the fact that the FELK button is turned on from the strobe microcomputer 310, the camera microcomputer 101 transitions to step S102 to restart the light-emission amount automatically adjusting process in the metered manual of FIG. 3. Thereafter, the camera microcomputer 101 calculates the main appropriate light emission amount again from the photometry result before and after the pre-light emission, and sends the recalculated main appropriate light emission amount to the illumination apparatus 300. On the other hand, in a case where it is determined in step S305 that the button is not pressed, this process ends as it is.

If it is determined as NO in any of steps S302, S303, and S305, and this process ends, the strobe microcomputer 310 informs the fact to the camera microcomputer 101. When informed of this fact, the camera microcomputer 101 transitions the light-emission amount automatically adjusting process in the metered manual of FIG. 3 to step S108.

Returning to FIG. 3, in step S108, it is determined whether SW1 to start measuring light is turned on. If SW1 is turned on, the process proceeds to step S109. If SW1 is turned off, the process returns to step S101.

In step S109, a focus detection operation of a well-known phase difference detection method is performed by the focus detection circuit 107, and a focus driving is commanded to the lens microcomputer 201 to adjust the focus.

Next, in step S110, it is determined whether SW2 for starting photographing operation is tuned on. If SW2 is turned on, the process proceeds to step S111. If SW2 is turned off, the process returns to step S101.

In step S111, the photometric circuit 106 measures the subject luminance value By (=Bvo+Avo) again. This measurement is performed to handle a change in composition after the pre-light emission. In a case the FELK button is not turned on in step S101, the light is measured for the first time. Then, in step S112, the appropriate exposure amount (EvS) for calculating an exposure value is determined by a well-known algorithm on the basis of the photometry result acquired in step S111. In addition, the shutter speed of the shutter 103 and the aperture value of the aperture 205 are also determined according to a set exposure mode. Subsequently, in step S113, the main mirror 104 (FIG. 2) and the sub-mirror 115 (FIG. 2) are turned up before the exposure operation, and retreated from the photographic optical path.

Then, in step S114, the aperture value determined in step S112 is commanded to the lens microcomputer 201, the aperture 205 is set to the aperture value by the aperture control circuit 206. Thereafter, the shutter 103 commanded to the shutter control circuit is driven at the shutter speed determined in step S112. Further, in step S115, the strobe microcomputer 310 causes the light-emitting part of the illumination apparatus 300 to perform the main light emission at the currently-set light emission amount in accordance with the driving timing of the shutter 103.

If the main light emission of step S115 ends, in step S116, the main mirror 104 and the sub-mirror 115 retreated from the photographic optical path are turned down (inclined in the photographic optical path), and this process ends.

As described above, when the light-emission amount automatic adjustment in the metered manual starts in the manual light-emission mode, the camera microcomputer 101 calculates the main appropriate light emission amount from the photometry result before and after the pre-light emission. In addition, the strobe microcomputer 310 changes the light emission amount from the manual light amount to the main appropriate light emission amount in a case where the main appropriate light emission amount falls within the second range and is outside the first range. With this configuration, it is possible to use the light adjustment range of the light-emitting part of the illumination apparatus 300 to the maximum. Therefore, the range which the user can set as the light emission amount in the main light emission is widened and it is possible to increase a chance to obtain an appropriate exposure in the strobe photographing.

In addition, it is determined whether the setting range of the light emission amount in the main light emission in the light-emission amount automatic adjustment in the metered manual is set to the first range or the second range according to the user operation in steps S205 and S302. With this configuration, the user can set the light emission amount in the main light emission within a desired range.

Hitherto, the description has been given about the first embodiment according to the invention. However, the invention is not limited to the first embodiment, and various modifications and changes may be made within a scope of the spirit.

For example, in the first embodiment, the light-emission amount automatic adjustment in the metered manual of FIG. 3 is performed by the camera microcomputer 101. The light-emission amount changing process of FIG. 4 and the light-emission amount re-setting process of FIG. 5 are performed by the strobe microcomputer 310, but the invention is not limited thereto. For example, all the processes are performed by one of the camera microcomputer 101 and the strobe microcomputer 310, and information necessary for the camera body 100 or the illumination apparatus 300 may be sent to the camera body 100 or the illumination apparatus 300 from the executing entity.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-233565 filed Dec. 13, 2018 which is hereby incorporated by reference herein in its entirety.

What is claimed is:

1. A photographing system which includes an image pickup apparatus equipped with a photometric circuit to measure a reflected light from a subject, and an illumination apparatus equipped with a light-emitting part to perform a pre-light emission and a main light emission, the photographing system comprising:

at least one memory that stores a set of instructions; and
at least one processor that executes the instructions, causing the photographing system to perform operations comprising:
setting a light emission amount of the light-emitting part in the main light emission within a first range by a user operation in a manual light-emission mode;
calculating a main light emission amount on a basis of a photometry result of the pre-light emission by the photometric circuit when a light-emission amount automatic adjustment starts in the manual light-emission mode after the light emission amount of the light-emitting part in the main light emission is set; and changing the light emission amount of the light-emitting part in the main light emission to the calculated main light emission amount in a case where the calculated main light emission amount falls within a second range and is outside the first range, wherein the second range includes the first range and is wider than the first range, and wherein the second range permits performing automatic light adjustment in the illumination apparatus.

2. The photographing system according to claim 1, wherein the instructions further include an instruction for starting the light-emission amount automatic adjustment in the manual light-emission mode according to the user operation.

3. The photographing system according to claim 1, wherein the instructions further include instructions for:

selecting the first range or the second range as a setting range of the light emission amount of the light-emitting part in the main light emission at time of the light-emission amount automatic adjustment according to the user operation, and changing the light emission amount of the light-emitting part in the main light emission to the calculated main light emission amount in a case where the second range is selected as the setting range of the light emission amount of the light-emitting part in the main light emission.

4. The photographing system according to claim 1, further comprising a first display unit configured to, in a case where the light emission amount of the light-emitting part in the main light emission is changed, display a notification of the change.

5. The photographing system according to claim 3, further comprising a second display unit configured to, in a case where the first range is selected as the setting range of the light emission amount of the light-emitting part in the main light emission, and the calculated main light emission amount falls within the second range and is outside the first range, display a recommendation to expand the setting range of the light emission amount of the light-emitting part to the second range in the main light emission.

6. The photographing system according to claim 1, wherein the instructions further include instructions for:

determining the second range as a re-setting allowed range that allows reset of the light emission amount of the light-emitting part in the main light emission according to a user operation in a case where the light emission amount of the light-emitting part in the main light emission is changed;

resetting the light emission amount of the light-emitting part in the main light emission within the determined re-setting allowed range according to the user operation; and changing the re-setting allowed range to the first range in a case where the re-set light emission amount falls within the first range.

7. The photographing system according to claim 6, wherein the instructions further include instructions for:

restarting the light-emission amount automatic adjustment according to a user operation after the re-setting allowed range is changed to the first range;

recalculating the main light emission amount on a basis of the photometry result of the pre-light emission by the photometric circuit in a case where the light-emission amount automatic adjustment is restarted; and changing the light emission amount of the light-emitting part in the main light emission to the re-calculated main light emission amount again in a case where the re-calculated main light emission amount falls within the second range and is outside the first range.

8. The photographing system according to claim 6, further comprising a third display unit configured to display a light amount difference between the calculated main light emission amount and the light emission amount of the light-emitting part in the main light emission changed, wherein the light amount difference is changeable by a user operation, and wherein the instructions further include an instruction for resetting, in a case where the re-set light emission amount falls within the second range and is outside the first range, the light emission amount of the light-emitting part in the main light emission according to a change of the light amount difference by the user operation.

9. An illumination apparatus which includes a light-emitting part to perform a pre-light emission and a main light emission, the light-emitting part being connected to an image pickup apparatus equipped with a photometric circuit to measure a reflected light from a subject, the illumination apparatus comprising:

at least one memory that stores a set of instructions; and at least one processor that executes the instructions, causing the illumination apparatus to perform operations comprising:

acquiring a light emission amount of the light-emitting part in the main light emission which is set by a user within a first range in a manual light-emission mode;

acquiring a main light emission amount on a basis of a photometry result of the pre-light emission by the photometric circuit in a case where a light-emission amount automatic adjustment starts in the manual light-emission mode; and changing the light emission amount of the light-emitting part in the main light emission to the acquired main light emission amount in a case where the acquired main light emission amount falls within a second range and is outside the first range, wherein the second range includes the first range and is wider than the first range, and wherein the second range permits performing automatic light adjustment in the illumination apparatus.

10. The illumination apparatus according to claim 9, wherein the instructions further include an instruction for starting the light-emission amount automatic adjustment in the manual light-emission mode according to the user operation.

11. The illumination apparatus according to claim 9, wherein the instructions further include instructions for:

selecting the first range or the second range as a setting range of the light emission amount of the light-emitting part in the main light emission at time of the light-emission amount automatic adjustment according to the user operation, and changing the light emission amount of the light-emitting part in the main light emission to the calculated main light emission amount in a case where the second range is selected as the setting range of the light emission amount of the light-emitting part in the main light emission.

12. The illumination apparatus according to claim 9, further comprising a first display unit configured to, in a case where the light emission amount of the light-emitting part in the main light emission is changed, display a notification of the change.

13. The illumination apparatus according to claim 9, wherein the instructions further include instructions for:
   determining the second range as a re-setting allowed range that allows reset of the light emission amount of the light-emitting part in the main light emission according to a user operation in a case where the light emission amount of the light-emitting part in the main light emission is changed;
   resetting the light emission amount of the light-emitting part in the main light emission within the determined re-setting allowed range according to the user operation; and
   changing the re-setting allowed range to the first range in a case where the re-set light emission amount falls within the first range.

14. A control method for a photographing system which includes an image pickup apparatus equipped with a photometric circuit to measure a reflected light from a subject and an illumination apparatus equipped with a light-emitting part to perform a pre-light emission and a main light emission, the control method comprising:
   setting a light emission amount of the light-emitting part in the main light emission within a first range by a user operation in a manual light-emission mode;
   calculating a main light emission amount on a basis of a photometry result of the pre-light emission by the photometric circuit when a light-emission amount automatic adjustment starts in the manual light-emission mode after the light emission amount of the light-emitting part in the main light emission is set; and
   changing the light emission amount of the light-emitting part in the main light emission to the calculated main light emission amount in a case where the calculated main light emission amount falls within a second range and is outside the first range,
   wherein the second range includes the first range and is wider than the first range, and
   wherein the second range permits performing automatic light adjustment in the illumination apparatus.

* * * * *